United States Patent Office 3,736,253
Patented May 29, 1973

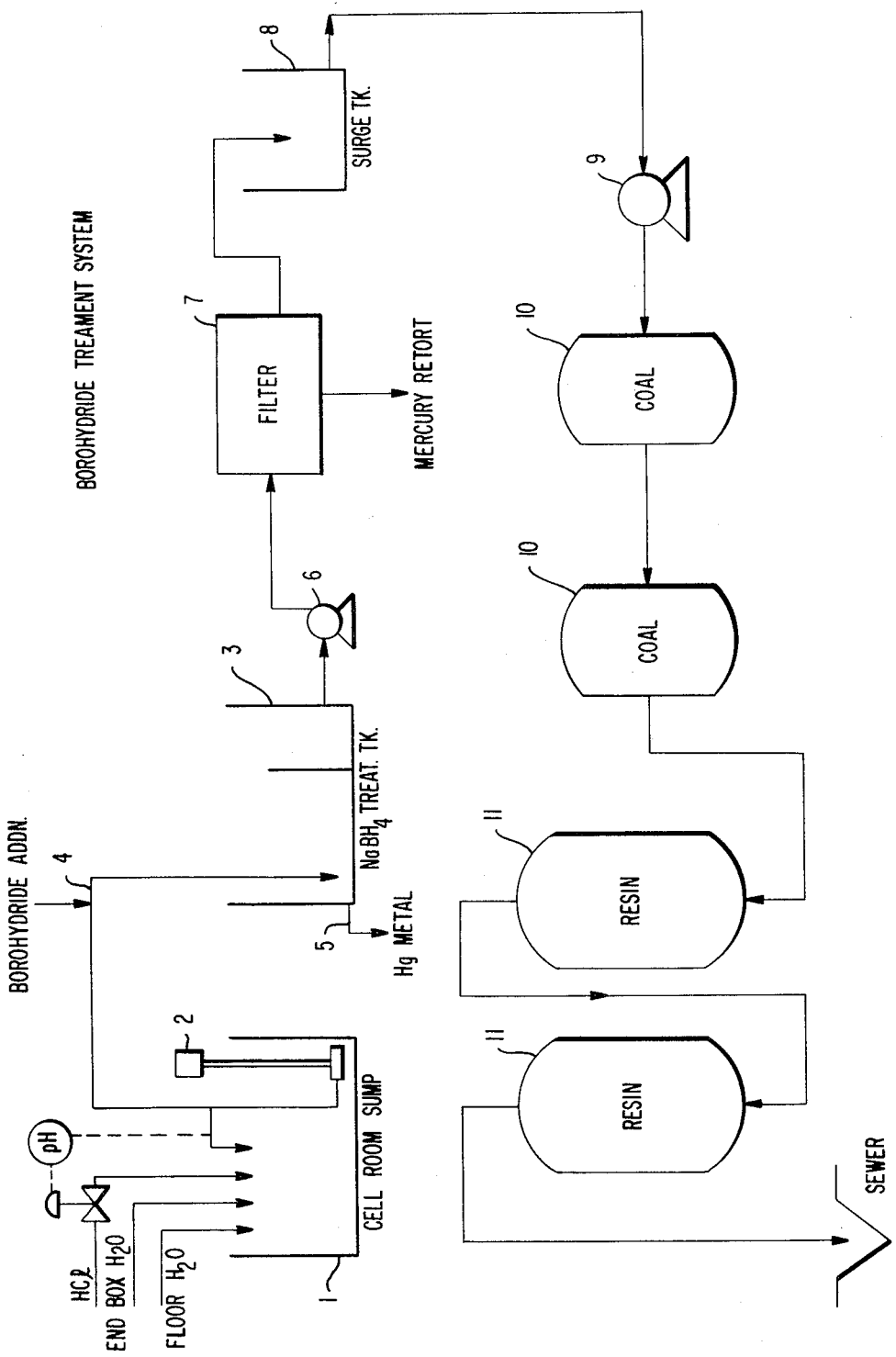

3,736,253
PROCESS AND APPARATUS FOR REMOVING MERCURY FROM WASTE WATER
Peter De Angelis and Alfred R. Morris, Brewer, and Alan L. MacMillan, Belfast, Maine, assignors to Sobin Chlor-Alkali, Inc., Orrington, Maine
Filed Apr. 10, 1972, Ser. No. 242,326
Int. Cl. B01j 1/22; C02b 1/14
U.S. Cl. 210—27
14 Claims

ABSTRACT OF THE DISCLOSURE

A method for removing mercury from water contaminated with mercury comprising contacting water containing metallic mercury with finely divided anthracite coal. The mercury laden water can be first treated with sodium borohydride to reduce dissolved mercury to the metallic form. The water treated with reducing agent, is filtered through a pressure leaf filter coated with a filter aid, contacted with anthracite coal and contacted with chelating resin.

DESCRIPTION OF THE INVENTION

This invention is directed to a process and apparatus for removing mercury from water contaminated with mercury and in particular for removing mercury from the aqueous wastes of industrial plants.

Industrial plants produce millions of gallons of waste water annually. Much of this water contains mercury in the form of aqueous solutions or suspensions of compounds of mercury or finely divided free mercury. For instance, waste water from electrolytic plants contains such diverse kinds of coexisting ions and composites as NaCl, NaClO, $Ca^{++}$, $Mg^{++}$, and $Fe^{+++}$, etc., and in the presence of such ions mercury takes various forms, as $HgCl_4^-$, $Hg(OH)_2$, $HgCl$, $(HgCl)_2O$, metallic mercury and mercury adbsorbed on fine particles. In particular, a chlor-alkali process produces a waste water laden with mercury in the free metal, mercuric and mercurous forms.

It is highly desirable to reduce the level of mercury in aqueous wastes because mercury is a valuable metal and its efficient recovery can improve the profitability of a process. Moreover, mercury discharged into surface waters tends to poison its surroundings. Mercury contamination in fish, for example, has led to the removal and banning of certain fish from the market place. Moreover, various Government agencies either have placed or are in the process of establishing specific controls on the allowable mercury content in the effluents from industrial plants. By water contaminated with mercury is meant water which contains sufficient mercury in the form of free metal, dissolved mercury, organic mercury compounds, or inorganic mercurous or mercuric salts to cause said water to be considered unfit for human consumption or unsuitable for discharge into natural bodies of water such as rivers, streams, lakes and oceans.

It is known that mercury can be extracted from water by the use of certain chelating resins. A suitable process and chelating resin is disclosed, for example, in U.S. Pat. No. 3,083,070. This process, though highly effective, tends to be prohibitively expensive. A typical chelating resin may cost $2.00 per liter and hold only 13% of its weight of mercury, therefore, resin costs may be as high as $10.00 per pound of mercury removed.

An article in the Dec. 14, 1970 issue of "Chemical and Engineering News" describes a process wherein sodium borohydride is used as a reducing agent to reduce the mercury in waste water to the metallic state. A commercial version of this process removes the suspended metallic mercury from the waste water by filtering the sodium borohydride-treated water through a cartridge type filter employing a microporous filamentary cartridge of the throw-away type. Unfortunately the combination of borohydride treatment and cartridge filtration may not reduce the mercury content of waste water to a very low concentration. Various experiments utilizing the cartridge filter show a removal of mercury down to 1 to 5 p.p.m. from starting levels of 10 p.p.m. That is, from a practical viewpoint, an insufficient reduction in the mercury level since even such small amounts as 1 to 5 p.p.m. can cause serious contamination of rivers and streams.

Cartridge type filters become markedly inefficient in relatively short periods of time since they are rapidly plugged by the filtered mercury. Tests have shown that a 10-micron cartridge-type filter may become ineffective in only hours of plant use. Cartridge-type filters, moreover, must be thrown away after use and are not easily processed for mercury recovery.

It would be highly desirable if the mercury in the aqueous waste from industrial processes could be removed rapidly, inexpensively and essentially completely. It would be further desirable to utilize filtration and mercury recovery techniques which would reduce the level of mercury in aqueous waste to less than one part per million, which would allow the mercury to be recovered, and which would be relatively inexpensive because of low initial cost and reuse of materials.

It is an object of this invention to provide an efficient, economical process for the removal of mercury from contaminated water.

It is another object of this invention to provide an efficient, economical process for the removal of mercury from waste water.

It is a further object of this invention to provide an apparatus for the efficient filtration and removal from waste water.

In accordance with this invention, there is provided a process for reducing the mercury content of water contaminated with metallic mercury comprising contacting the water with finely divided anthracite coal. In one embodiment the novel process of this invention can reduce the mercury content of waste water to 3 to 50 parts per billion while providing low total costs and easy mercury regeneration.

Anthracite coal has been used previously to filter drinking water in water purification plants. However, in this capacity it has been used merely as a substitute for sand. In accordance with this invention, however, it has been discovered that finely divided anthracite coal is not merely the equivalent of other filtering agents but actually removes finely divided metallic mercury from contaminated water even when that water has been previously filtered using conventional filtration techniques.

The finely divided anthracite coal can be regenerated by simply distilling the mercury by heating the anthracite or dissolving out the mercury with chlorine containing water or hydrochloric acid.

It is not know exactly why anthracite coal reduces the mercury content of the contaminated water so effectively and the invention is not bound by any particular mechanism of operation. It is believed, however, that the anthracite coal adsorbs the mercury. Attempts to obtain similar results under actual plant conditions with activated carbon have not proven satisfactory. Activated carbon does not have the long effective life of anthracite coal and does not give the degree of reduction in mercury content desired.

The anthracite coal used to remove the mercury is a standard finely divided anthracite coal used for filtering drinking water such as Anthrafilt or Filt-O-Cite. One commercial material has a density of approximately 52 lbs. per cubic foot, a volume of about 39.2 cubic feet per ton, a specific gravity of about 1.52 and an angular shape of grain. Generally, the finely divided anthracite coal particles range in size from about size 7, having a particle size of 2⁷⁄₁₆ in. by 1⅝ in. to about size ½ in. having an effective particle size of .10 to .20 mm. It is particularly preferred to use about size No. 1 having an effective particle size of from about 0.60 to about 0.80 mm.

The mercury in the waste water need not be entirely in the form of metallic mercury. There may also be present mercury in the mercuric or mercurous form. It is preferred however, to first treat the mercury with a reducing agent such as sodium borohydride in order to reduce as much of the mercury as possible to the metallic form. It is believed that metallic mercury is very slightly soluble in water. Accordingly, when metallic mercury is combined with water, some of the mercury, as much as 60 parts per billion, goes into solution. The sodium borohydride causes this dissolved mercury to agglomerate in the form of a fine colloidal dispersion of the mercury in water whereby it is more readily removed from the water.

In accordance with this invention there is provided a process for reducing the mercury content of mercury bearing water comprising treating said water with a reducing agent whereby a major portion of the non-metallic mercury in said water is reduced to the metallic form and contacting the treated water with finely divided anthracite coal.

The reducing agent used is preferably sodium borohydride but may be any alkali metal borohydride capable of reducing the mercury to the metallic state. Any conventional method of reducing the mercury can also be used. For example, the mercury can be reduced with hydrazine rather than with a borohydride.

The preferred borohydride is that normally supplied as a stabilized water solution (SWS) which is 12% $NaBH_4$, 42% $NaOH$, with the balance being water. The amount added is calculated based on the weight of mercury in the waste water. Theoretically, sodium borohydride has 8 electrons available and mercuric mercury can accept 2 electrons. Therefore, one molecule of sodium borohydride can reduce 8 atoms of mercuric mercury. Converting this to weight, 38 lbs. of sodium borohydride can reduce 800 lbs. of mercuric mercury which is a weight ratio of 1:21.

In actual practice the borohydride:mercury ratio used may vary since (1) some of the mercury may be in the form of mercurous mercury which only requires half as much $NaBH_4$ as mercuric mercury, and some may be metallic mercury which does not require any $NaBH_4$ and (2) other compounds may react with the borohyride making it unavailable for reduction of mercury. A 100% excess of borohydride can be added to ensure maximum reduction of mercury.

In accordance with one embodiment of this invention there is provided a process for reducing the mercury content of water contaminated with mercury which comprises filtering water containing metallic mercury through a first stage filter means before contacting said stream with finely divided anthracite coal.

The first stage filter means is preferably a pressure leaf filter coated with a filter aid such as diatomaceous earth or cellulose fiber. A suitable pressure leaf filter is a U.S. Tray Flo filter No. 265 which has ten trays with a total surface area of 110 sq. ft. Conventional techniques well known in the art are used to pre-coat the filter.

In place of the pressure leaf filter one can substitute a cartridge filter such as the Cuno filters which employ filament wound polypropylene cartridges having pore sizes in the range of 1 to 20 micron. Moreover, the finely divided anthracite coal itself may be used as the first stage filter means. If this is done, it is preferred that the anthracite coal filters be used in series rather than in parallel. It is also possible, moreover, to substitute other filter materials for the first filtration stages such as the standard caustic soda filters which employ porous-carbon tubes for filtration.

Experiments have shown that the pressure leaf type filter precoated with diatomaceous earth is especially effective as a first stage filter. It removes a major amount of the metallic mercury. Moreover, the metallic mercury is easily recovered from the filter cake by distilling the filter cake in a retort. Tests comparing the pressure leaf filter with a Cuno Filter varying in particle size from 1 to 10 microns and an Adam's poro-carbon caustic filter demonstrate that the diatomaceous earth filter was far more effective in reducing mercury, had a longer plant life, and could be (cleaned) and re-used resulting in lower costs.

In accordance with another embodiment of this invention there is provided a process of reducing the mercury content of mercury contaminated water which comprises treating the contaminated water with a reducing agent whereby a major proportion of the non-metallic mercury in the water is reduced to the metallic form, filtering the treated water through a first stage filter means, contacting the filtered water with finely divided anthracite coal and passing the water through a bed of chelating resin. The chelating resin aids in removing those traces of mercury not removed by the anthracite coal.

The preferred chelating resin used is a commercially available chelating resin sold by Ajinamoto Co., Inc., Tokyo, Japan. It is known to the trade as a "Resinous Mercury Adsorbent." The particular chelating resin used, however, is not critical. In place of the preferred chelating resin one can use the chelating resin of U.S. Pat. No. 3,083,070.

It is possible to employ only anthracite coal followed by a chelating resin (thereby eliminating the first filter stage) or, to eliminate the chelating resin entirely and utilize only the beds of anthracite coal to adsorb the mercury.

The preferred chelating resin is sensitive to alkali and tends to dissolve when the pH of the aqueous waste stream exceeds about 12. Accordingly, when such resin is employed it has been found preferable to adjust the pH of the waste stream with an inorganic acid prior to treating with reducing agent. The preferred pH range is from about 8 to about 11. It may be desirable to reduce the pH even further just prior to passing the aqueous stream through the chelating resin. As effective pH reducing acids, one can use inorganic acids such as $HCl$, $H_2SO_4$, $H_3PO_4$, etc.

This invention also contemplates the unique combination of filtration and adsorption process steps and filtration and adsorption equipment which reduces the mercury content of waste water with maximum mercury removal, great ease and rapidity of filtration and minimum cost. This unique combination comprises:

(1) Filtration of a mercury laden stream through a pressure leaf filter means precoated with a filter aid.

(2) Adsorption of a major portion of unfiltered mercury by passing the filtrate through a gross mercury removing means comprising a bed of finely divided anthracite coal.

(3) Adsorption of residual mercury from the filtrate by passing of the filtrate through a fine mercury removing means comprising a bed of chelating resin.

For a more comprehensive understanding of the invention, reference should be made to the drawing which shows a typical arrangement for the practice of the invention.

Waste process water from the chlor-alkali process is collected from the end boxes of the cells and the floor sumps in cell room sump 1. Besides containing mercury in solution and suspension, other impurities that might be present in varying amounts are: sodium chloride, sodium hydroxide, chlorine, sodium hypochlorite and dirt from floor washing.

The water is adjusted with hydrochloric acid to a pH preferably in the range of 8 to 11. The aqueous stream is pumped through sump pump 2 to tank 3. While being pumped, alkali metal borohydride is added through mixing T 4 to reduce the mercury to the metallic state. Metallic metal is precipitated and settles to the bottom of tank 3 and is withdrawn through pipe 5 to be reclaimed using standard reclamation procedure. The supernatant liquid that remains is pumped through pump 6 into a filter 7. This filter is preferably a pressure leaf filter precoated with a filter aid such as diatomaceous earth or cellulose fiber. The filtrate is then pumped into surge tank 8 through pump 9 into beds 10 of finely divided anthracite coal which adsorb the major amount of mercury remaining in the filtrate. The filtrate is then pumped to beds 11 of chelating resin to remove any residual traces of mercury.

The following table indicates the typical results obtained using sodium borohydride reducing agent, a pressure leaf filter coated with diatomaceous earth, a bed of anthracite coal and two beds of chelating resin connected in series.

| | Results of mercury removal process, all readings in parts per million (p.p.m.) | | | | | | |
|---|---|---|---|---|---|---|---|
| | 1st day | | | 2d day | 3rd day | 4th day | |
| | 8 a.m. | 11 a.m. | 3 p.m. | 1 p.m. | 12:30 p.m. | 11 a.m. | 2:30 p.m. |
| Feed | 5.2 | 2.2 | 3.7 | 2.0 | 1.4 | 11.9 | 8.3 |
| After reaction tank | 7.5 | 5.0 | 3.5 | 1.3 | 1.4 | 16.0 | 3.3 |
| After filter | 4.6 | 2.5 | 3.4 | .71 | .7 | 2.3 | 2.0 |
| After coal | .23 | .049 | .040 | .12 | .096 | .15 | .54 |
| After 1st resin | .012 | .016 | .011 | .023 | .028 | .031 | .032 |
| After 2d resin | .016 | .016 | .005 | .012 | .011 | .016 | .024 |
| Percent removal | 99.7 | 99.3 | 99.9 | 99.4 | 99.2 | 99.9 | 99.7 |

It is evident from the above table that the process removes the major part of the mercury in waste water. It is further evident that the bed of anthracite coal makes a major reduction in the mercury content of a previously filtered mercury laden stream.

The following examples serve to further describe the invention and are not limiting thereof.

EXAMPLE 1

A sample of water containing finely dispersed metallic mercury and/or other mercury compounds in solution was passed through a Gooch crucible filled with about 3 grams of No. 1 anthracite coal filter media to determine its effectiveness. The sample showed 0.760 p.p.m. mercury before filtration and about 0.0091 p.p.m. after filtration. This represents a 98.8% removal of the mercury.

EXAMPLE 2

Approximately 5 gallons per minute of mercury laden water which had been treated with sodium borohydride was fed to a plant size filter bed of No. 1 anthracite coal.

Runs I and II were each run continuously over a period of time and tests were taken when the run was initiated and after the time period was ended. Results are as follows:

| | | P.p.m. mercury | |
|---|---|---|---|
| Run No. | Test | Before | After |
| I | Initial | 0.66 | 0.075 |
| | Next day | 0.66 | 0.123 |
| II | Initial | 0.53 | 0.008 |
| | Two days later | 1.6 | 0.340 |

The anthracite coal causes a major reduction of the concentration of mercury in the water even when the initial mercury level is quite low. Moreover, the anthracite coal maintains its effectiveness for a relatively long period of time.

EXAMPLE 3

Sodium borohydride was added to a mercury laden stream flowing at a rate of 3.0 gallons per minute. The mercury was reduced and the stream filtered in series through an Adams Filter containing porous carbon tubes, a Cuno porous cartridge filter having a pore size of 1 micron and a 50-gallon drum filled with finely divided anthracite coal. The following mercury levels in parts per million mercury were obtained.

| Date | Inlet Adams filter | Inlet Cuno | Inlet drum filter | Outlet drum |
|---|---|---|---|---|
| 4/12: | | | | |
| 12:30 p.m. | 5.9 | .62 | .32 | .06 |
| 8:45 p.m. | 7.7 | 3.0 | .50 | .092 |
| 4/13: | | | | |
| 9:45 p.m. | 20.0 | .42 | .24 | .088 |
| 1:45 p.m. | 18.4 | 3.5 | 3.2 | 1.4 |
| 7:00 p.m. | 5.5 | 8.0 | 7.6 | 3.7 |
| 4/14 | 8.1 | 4.1 | 4.1 | 1.8 |

It is evident that despite two intermediate stage filters, the anthracite coal is still capable of removing mercury from the waste stream and retains this capability for a considerably longer time than the conventional filters.

What is claimed is:

1. A process for removing mercury from water contaminated with metallic mercury comprising contacting said contaminated water with finely divided anthracite coal.

2. The process of claim 1 wherein said water contaminated with metallic mercury is passed through a bed of finely divided anthracite coal.

3. A process for removing mercury from water contaminated with mercury comprising treating said water with a reducing agent whereby a major portion of the non-metallic mercury in said water is reduced to the metallic form and contacting the treated water with finely divided anthracite coal.

4. The process of claim 3 wherein the reducing agent is an alkali metal borohydride.

5. The process of claim 3 wherein the treated water is filtered prior to being passed through the finely divided anthracite coal.

6. The process of claim 5 wherein the treated water is filtered through a pressure leaf filter coated with a filter aid.

7. The process of claim 1 wherein the contaminated water is further treated with a chelating resin capable of removing mercury.

8. The process of claim 3 wherein the treated water is further treated with a chelating resin capable of removing mercury.

9. The process of claim 4 wherein the treated water is further treated with a chelating resin capable of removing mercury.

10. The process of claim 6 wherein the treated water is further treated with a chelating resin capable of removing mercury.

11. The process of claim 2 wherein the contaminated water is filtered through a pressure leaf filter coated with a filter aid prior to being passed through the bed of finely divided anthracite coal.

12. The process of claim 11 wherein the contaminated water is further treated with a chelating resin capable of removing mercury.

13. The process of claim 1 wherein the water contaminated with mercury is waste water from industrial plants.

14. The process of claim 3 wherein the water contaminated with mercury is waste water from industrial plants.

References Cited

UNITED STATES PATENTS

| | | | |
|---|---|---|---|
| 3,476,552 | 11/1969 | Parks et al. | 75—101 R |
| 2,191,063 | 2/1940 | Smit | 210—38 X |
| 3,679,052 | 7/1972 | Asper | 210—75 |
| 3,083,079 | 3/1963 | Calkins et al. | 423—100 |
| 3,627,482 | 12/1971 | Olson et al. | 75—101 R |
| 3,085,859 | 4/1963 | Scholten et al. | 75—101 R |
| 2,161,710 | 6/1939 | Jaeger | 210—38 X |

SAMIH N. ZAHARNA, Primary Examiner

T. G. WYSE, Assistant Examiner

U.S. Cl. X.R.

75—109; 210—28, 40, 50; 423—101